(12) United States Patent
Chen et al.

(10) Patent No.: US 7,092,554 B2
(45) Date of Patent: Aug. 15, 2006

(54) METHOD FOR DETECTING EYE AND MOUTH POSITIONS IN A DIGITAL IMAGE

(75) Inventors: Shoupu Chen, Rochester, NY (US); Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 689 days.

(21) Appl. No.: 09/846,718

(22) Filed: May 1, 2001

(65) Prior Publication Data

US 2003/0021448 A1  Jan. 30, 2003

(51) Int. Cl.
*G06K 9/00* (2006.01)
*G06K 9/62* (2006.01)

(52) U.S. Cl. .................. 382/118; 382/165; 382/225
(58) Field of Classification Search ............... 382/117, 382/118, 164, 165, 224–228, 168–171
See application file for complete search history.

(56) References Cited

U.S. PATENT DOCUMENTS

| | | | | |
|---|---|---|---|---|
| 6,049,626 A * | 4/2000 | Kim | ............................ | 382/167 |
| 6,072,892 A | 6/2000 | Kim | ............................ | 382/117 |
| 6,072,893 A | 6/2000 | Luo et al. | | |
| 6,151,403 A * | 11/2000 | Luo | ............................ | 382/117 |
| 6,633,655 B1 * | 10/2003 | Hong et al. | .................. | 382/118 |
| 6,711,587 B1 * | 3/2004 | Dufaux | .................... | 707/104.1 |
| 2001/0014182 A1 * | 8/2001 | Funayama et al. | ........... | 382/282 |
| 2002/0136450 A1 * | 9/2002 | Chen et al. | .................. | 382/165 |

FOREIGN PATENT DOCUMENTS

| | | |
|---|---|---|
| EP | 0 899 686 A2 | 3/1999 |
| EP | 0 899 686 A3 | 3/1999 |

OTHER PUBLICATIONS

Gonzalez and Woods. "Digital Image Processing" 1rst Ed., 1992, Addison-Wesley Publishing Company, Inc. pp. 196-198, 586-595.*
Ohtsuki et al., "Using Color and Geometric Models For Extracting Facial Features," *Journal of Imaging Science and Technology*, vol. 42, No. 6, pp. 554-561, 1998.
Hsin-Chia Fu et al., IEEE 2000, pp. 507-516, Face Detection and Eye Localization by Neural Network Based Color Segmentation, National Chiao Tung University.

(Continued)

*Primary Examiner*—Vikkram Bali
*Assistant Examiner*—Colin LaRose
(74) *Attorney, Agent, or Firm*—Susan L. Parulski

(57) ABSTRACT

A digital image processing method for locating eyes and mouth in a digital face image. The method includes the steps of detecting iris colored pixels in the digital face image; grouping the iris colored pixels into clusters; detecting eye positions using the iris colored pixels; identifying salient pixels relating to a facial feature in the digital face image; generating a signature curve using the salient pixels; and using the signature curve and the eye positions to locate a mouth position. In a preferred embodiment, a summation of squared difference method is used to detect the eye positions. In another preferred embodiment, the eyes and mouth positions are validated using statistics.

13 Claims, 14 Drawing Sheets

OTHER PUBLICATIONS

Liyanage C. DeSilva et al., IEICE Transactions on Information and Systems, Sep., No. 9, Tokyo, JP, Detectino and Tracking Facial Features by Using Edge Pixel Counting and Deformable Circular Template Matching, pp. 1195-1207.

Robert Brunelli et al., IEEE Transactions on Pattern Analysis and Machine Intelligence, Oct. 1993, No. 10, NY, Face Recognition: Features versus Templates, pp. 1042-1052.

* cited by examiner

| -1/9 | -1/9 | -1/9 |
|---|---|---|
| -1/9 | H | -1/9 |
| -1/9 | -1/9 | -1/9 |

METHOD FOR DETECTING EYE AND MOUTH POSITIONS IN A DIGITAL IMAGE

FIELD OF THE INVENTION

The present invention relates to digital image processing methods, and more particularly to methods of detecting human eye and mouth positions.

BACKGROUND OF THE INVENTION

In digital image processing it is often useful to find the eye-mouth coordination, that is, to detect/locate an eye and mouth position. This information can be used, for example, to find the pose of a human face in the image. Since human faces may often be distinguished by their features, eye-mouth coordination also can be used as a pre-processor for applications such as face recognition that is further used in image retrieval.

U.S. Pat. No. 6,072,892 (Kim) which issued Jun. 6, 2000 discloses an eye position detecting apparatus and method. The disclosed method for detecting the position of eyes in a facial image uses a thresholding method on an intensity histogram of the image to find three peaks in the histogram representing skin, white of the eye, and pupil.

While this method may have achieved a certain degree of success in its particular application, one of the problems with this method is that it needs to scan the entire image pixel by pixel and position a search window at each pixel. As such, it consumes enormous computing power. Further, it may also produce a high rate of false positives because similar histogram patterns occur in places other than eye regions.

In "Using color and geometric models for extracting facial features", Journal of Imaging Science and Technology, Vol. 42, No. 6, pp. 554–561, 1998, Tomoyuki Ohtsuki of Sony Corporation proposed a region segmentation method to find mouth candidates. However, a region segmentation, in general, is very sensitive to luminance and chromaticity variations, and therefore very unstable.

Accordingly, a need continues to exist for a method of utilizing information embedded in a digital facial image to determine human eye-mouth coordination in a robust, yet computationally efficient manner.

SUMMARY OF THE INVENTION

An object of the present invention is to provide a digital image processing method for locating eyes and mouth in a digital face image.

Still another object of the present invention is to provide such a method which is effective for automatically obtaining eye and mouth positions in a frontal face image.

Yet another object of the present invention is to provide such a method which reduces the region of the image that must be searched.

Another object of the present invention is to provide such a method which reduces the computation required to locate the eye and mouth.

A still further object of the present invention is to provide such a method which reduces the incidence of false positives.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a digital image processing method for locating eyes and mouth in a digital face image. The method includes the steps of detecting iris colored pixels in the digital face image; grouping the iris colored pixels into clusters; detecting eye positions using the iris colored pixels; identifying salient pixels relating to a facial feature in the digital face image; generating a signature curve using the salient pixels; and using the signature curve and the eye positions to locate a mouth position. In a preferred embodiment, a summation of squared difference method is used to detect the eye positions. In another preferred embodiment, the eyes and mouth positions are validated using statistics.

The present invention provides a method which is effective for automatically obtaining eye and mouth positions in a frontal face image. The method reduces the region of the image that must be searched, thereby reducing the computation required to locate eye and mouth, and reducing the incidence of false positives.

DETAILED DESCRIPTION OF THE INVENTION

Figure 1:
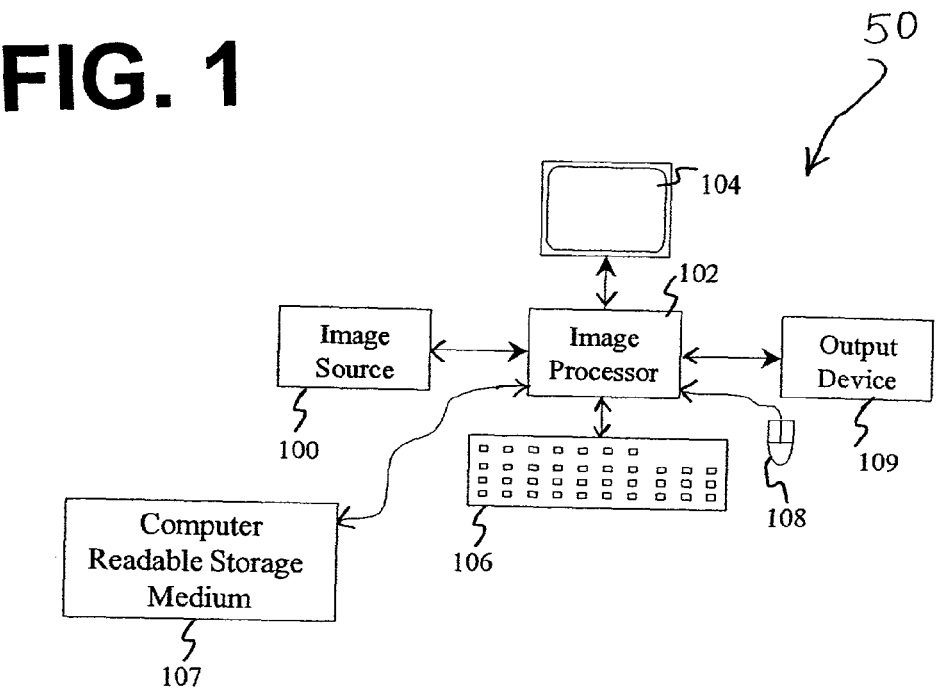
FIG. 1 shows a schematic diagram of an image processing system suitable for use with a method in accordance with the present invention.

FIG. 1 shows an image processing system 50 suitable for use with a method in accordance with the present invention. System 50 includes a digital image source 100 adapted to provide a color digital still image. Examples of digital image source 100 include a scanner or other device for capturing images and converting the image for storage in digital form, a digital image capture device such as a digital camera, and a digital image storage device such as a memory card or compact disk drive with a CD.

The digital image is a facial image, preferably a frontal view, though the image may be angled from a frontal view.

The digital image from digital image source 100 is provided to an image processor 102, such as a programmable personal computer, or digital image processing work station such as a Sun Sparc workstation. Image processor 102 processes the digital image in accordance with the method of the present invention.

As illustrated in FIG. 1, image processor 102 may be networked/connected to a CRT display or image display 104, an interface device or other data/command entry device such as a keyboard 106, and a data/command control device such as a mouse 108. Image processor 102 may also be networked/connected to a computer readable storage medium 107.

Image processor 102 transmits the processed digital images to an output device 109. Output device 109 can comprise a printer, a long-term image storage device, a connection to another processor, or an image telecommunication device connected, for example, to the Internet. A printer, in accordance with the present invention, can be a silver halide printer, thermal printer, ink jet printer, electrophotographic printer, and the like.

In the following description, a preferred embodiment of the present invention is described as a method. In another preferred embodiment, described below, the present invention comprises a computer program for detecting human eyes and mouths in a digital image in accordance with the method described. As such, in describing the present invention, it should be apparent that the computer program of the present invention can be utilized by any computer system known to those skilled in the art, such as the personal computer system of the type shown in FIG. 1. Accordingly, many other types of computer systems can be used to execute the computer program of the present invention.

It will be understood that the computer program of the present invention may employ image manipulation algorithms and processes that are known to those skilled in the art. As such, the computer program embodiment of the present invention may embody conventional algorithms and processes not specifically shown or described herein that are useful for implementation.

Other aspects of such algorithms and systems, and hardware and/or software for producing and otherwise processing the images involved or co-operating with the computer program of the present invention, are not specifically shown or described herein and may be selected from such algorithms, systems, hardware, components and elements known in the art.

The computer program for performing the method of the present invention may be stored in computer readable storage medium 107. Medium 107 may comprise, for example, a magnetic storage media such as a magnetic disk (e.g., a hard drive or a floppy disk) or magnetic tape; an optical storage media such as an optical disc, optical tape, or machine readable bar code; a solid state electronic storage device such as random access memory (RAM), or read only memory (ROM); or any other physical device or medium employed to store a computer program. The computer program for performing the method of the present invention may also be stored on computer readable storage medium 107 connected to image processor 102 by means of the internet or other communication medium. Those skilled in the art will readily recognize that the equivalent of such a computer program may also be constructed in hardware.

Figure 2:
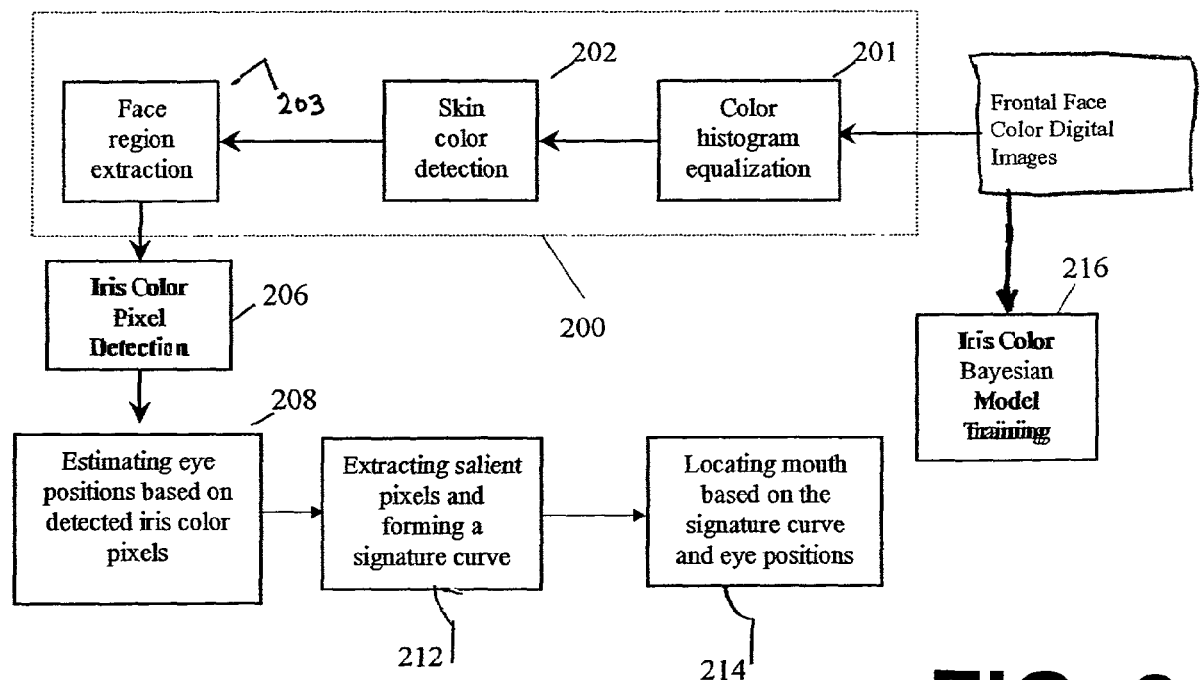
FIG. 2 shows a flow diagram illustrating the method of determining eye-mouth coordination in accordance with the present invention.

Turning now to FIG. 2, the method of the present invention will be described in detail. FIG. 2 is a flow diagram illustrating a first embodiment of the method in accordance with the present invention of determining eye-mouth coordination. In the first embodiment shown in FIG. 2, eye-mouth coordinate determination comprises several steps. A first step (step 200) comprises detecting skin color regions (i.e., face regions) in the digital image. A second step (step 206) comprises identifying iris color pixels from the face regions. A third step (step 208) comprises estimating eye positions from the detected iris color pixels of second step 206. A fourth step (step 212) comprises identifying/extracting salient pixels in the face region and forming a signature curve with the salient pixels. A fifth step (step 214) comprises estimating a mouth position based on the information gathered in third step 208 and fourth step 212.

A modeling step (step 216) comprises forming an iris color Bayesian model training wherein second step 206 is provided with a look-up table for detecting iris color pixels. Modeling step (step 216) is more particularly described below with regard to FIGS. 4(a) and 4(b). Further, modeling step 216 is performed once, preferably off-line.

First step 200 in skin color region detection comprises three steps as illustrated in FIG. 2, specifically, steps 201, 202, and 203. As illustrated in FIG. 2, step 201 is a color histogram equalization step. Color histogram equalization step 201 receives images to be processed and ensures that the images are in a form that will permit skin color detection. Step 201 is employed since human skin may take on any number of colors in an image because of lighting conditions, flash settings or other circumstances. As such, it generally difficult to automatically detect skin in such images. In color histogram equalization step 201, a statistical analysis of each image is performed. If the statistical analysis suggests that the image may contain regions of skin that have had their appearance modified by lighting conditions, flash settings or other circumstances, then such images are modified so that skin colored regions can be detected. The color histogram equalization of the digital face image is preferably performed based on a mean intensity analysis of the digital face image.

After color histogram equalization step 201, the image is searched for skin color regions in skin color detection step 202. While it is possible to detect skin in a digital image in a number of ways, a preferred method for detecting skin in a digital image is the method that is described in commonly assigned U.S. Ser. No. 09/692,930, which issued as U.S. Pat. No. 6,690,822, incorporated herein by reference. In this preferred method, skin color pixels are separated from other pixels by defining a working color space that contains a range of possible skin colors collected from a large, well-balanced population of images. A pixel is then identified as a skin color pixel if the pixel has a color that is within the working color space.

Skin color detection step 202 identifies a region of skin color pixels in the image. This region can be defined in any number of ways. In one embodiment, the skin color region is defined by generating a set of pixel locations identifying the pixels in the image having skin colors. In another embodiment, a modified image is generated that contains only skin color pixels. In yet another embodiment, skin color detection step 202 defines boundaries that confine the skin color region in the image. It will be recognized by those skilled in the art that more than one skin color region can be identified in the image.

Face region extraction step 203 examines the skin color regions detected by skin color detection step 202 to locate skin color regions that may be indicative of a face. Face region extraction step 203 defines parameters that describe the size of the face and the location of the face within the image.

Figure 3:
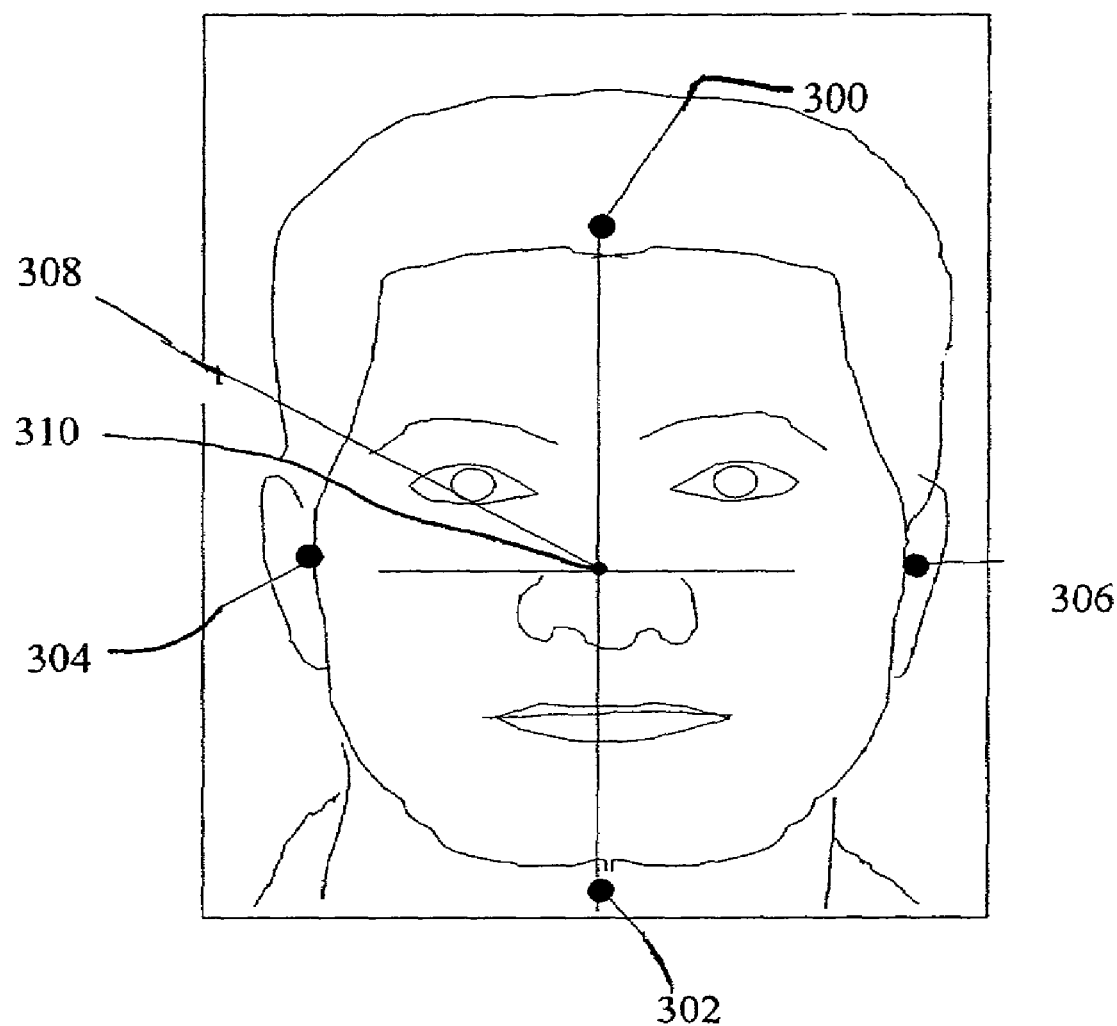
FIG. 3 is an illustration showing parameters of a human face region.

FIG. 3 more particularly illustrates the relationship between geometric parameters used to define a face region in the image. As shown in FIG. 3, geometric parameters may include a Face_top 300, Face_bottom 302, Face_left 304, Face_right 306, Face_center_row 308, and Face_center_column 310. These parameters can be used in subsequent processing of the image.

Once face region extraction step 203 has been performed, second step 206), i.e., the iris color pixel detection step, examines the pixels in the face region to detect iris color pixels. In the method in accordance with the present invention, second step 206 determines whether a pixel is an iris by measuring the red intensity of the pixel. Red intensity levels are measured since it has been observed that that a human iris has a low red intensity level as compared to human skin which has a relatively high red intensity level. However, the method in accordance with the present invention does not use a red level thresholding method to determine whether a pixel is to be classified as an iris or as a non-iris.

Figure 4A:
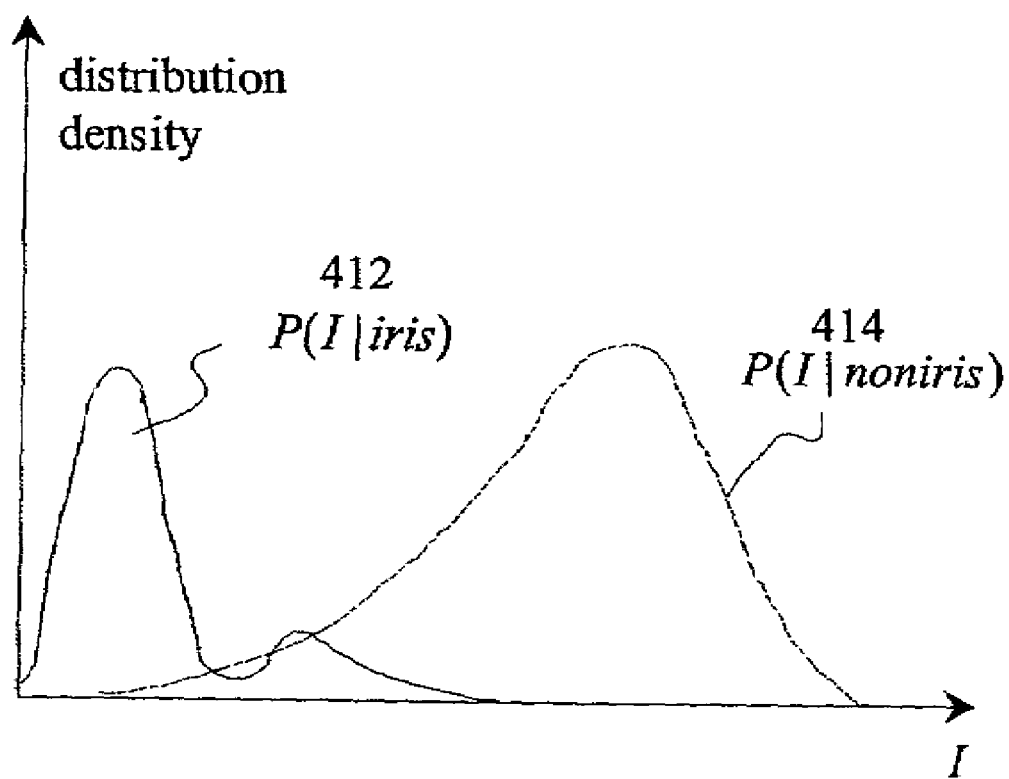
FIG. 4(a) shows a plot representing iris and noniris pixel intensity distributions.

Rather, the method of the present invention classifies a pixel as an iris or a non-iris pixel on the basis of a probability analysis. This probability analysis applies an iris statistical model. The iris statistical model defines the probability that a pixel is an iris pixel based on the given red intensity level of the pixel. To construct the iris statistical model, two conditional probability density distribution functions are needed. FIG. 4(a) shows the two conditional probability density distribution functions. Iris intensity distribution function P(I|iris) 412 represents the likelihood that a given iris pixel has a specific red intensity. For example, the likelihood that a given iris pixel has a red intensity level of 30 is 0.5, the same pixel has a red intensity level 255 is 0.0001. Noniris intensity distribution function P(I|noniris) 414 represents the likelihood that a given noniris pixel has a specific red intensity. For example, the likelihood that a given noniris pixel has a red intensity level of 30 is 0.0001, the same pixel has a red intensity level 255 is 0.1. The maximum value of a likelihood is one (e.g., 1).

The probability analysis can take many forms. For example, the probabilities can be combined in various ways with a pixel being classified as an iris or not on the basis of the relationship between these probabilities. However, in a preferred embodiment, a mathematical construct known as a Bayes model is employed to combine the probabilities to produce the posterior probability that a pixel having a given red intensity belongs to an iris.

In this preferred embodiment, the Bayes model is applied as follows:

$$P(iris|I) = \frac{P(I|iris)P(iris)}{P(I|iris)P(iris) + P(I|noniris)P(noniris)},$$

where P(iris|I) is a conditional probability that a given pixel intensity belongs to an iris; P(I|iris) is a conditional probability that a given iris pixel has a specific intensity I (i.e., iris intensity distribution function 412); P(iris) is a probability of the occurrence of an iris in the face region; P(I|noniris) is a conditional probability that a given non-iris pixel has a specific intensity I (i.e., noniris intensity distribution function 414); and P(noniris) is a probability of the occurrence of a non-iris pixel in the face oval region. Using a probability analysis based on the Bayes model, a pixel is classified as an iris if the conditional probability P(iris|I) that a pixel having a given red intensity belongs to an iris is greater than a pre-determined value, for example, 0.05.

In the embodiment described above, only those pixels in the face region defined by Face_top 300, Face_bottom 302, Face_left 304, and Face_right 306 are examined. Confining the pixels to be examined to those in the face region reduces the number of pixels to be examined and decreases the likelihood that pixels that are not irises will be classified as such. It will be recognized that shapes other than the one described above can be used to model the human face and that parameters that are appropriate to such shapes are used in subsequent processing of the image.

Further, it will be understood that iris pixels can be detected from a skin color region in an image without first detecting face boundaries or other shaped area. In such a case, each pixel of the skin color region is examined to detect iris color pixels and parameters defining the skin colored region are used later in the eye detection process.

Figure 4B:
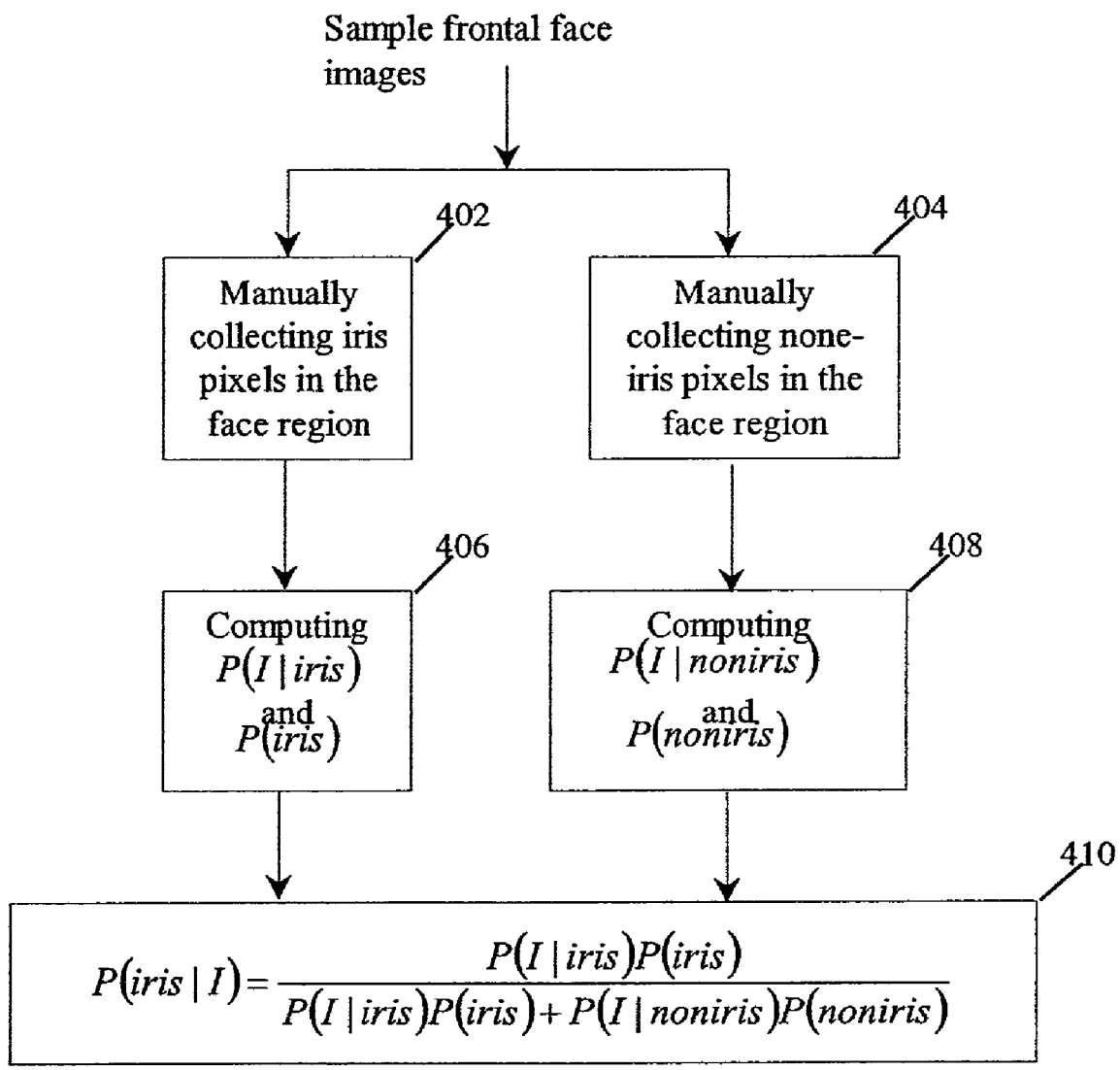
FIG. 4(b) shows a flow diagram illustrating the process of Bayesian iris modeling.

FIG. 4(b) shows a flow diagram illustrating the processes used in modeling step 216, that is, iris color Bayesian model training of FIG. 2, for developing the statistical models used to classify the pixels. Modeling step 216 is performed before the method for detecting irises is used to detect iris pixels. As is shown in FIG. 4(b), a large sample of frontal face images are collected and examined. All iris pixels and non-iris pixels in the face region of each image are then manually identified (steps 402 and 404). Next, the conditional probability that a given iris pixel has a specific red intensity I, P(I|iris), is computed and the probability of the occurrence of an iris in the face oval region, P(iris), is computed (step 406); then the conditional probability that a given noniris pixel has a specific red intensity I, P(I|noniris), is computed and finally the probability of the occurrence of a non-iris pixel in the face oval region, P(noniris), is computed (step 408). The computed statistical models of iris and non-iris are used in the Bayes formula to produce the conditional probability that a pixel with a given intensity belongs to an iris, P(iris|I) (step 410). In application, the Bayes model can be used to generate a look-up table to be used in second step 206 for iris color pixel detection. Second step 206, the iris color pixel detection step, identifies the location of the iris color pixels in the image. The result from second step 206 is an iris color pixel image in which noniris color pixels are set as zeros.

The iris color pixel image resulting from second step 206 is used in third step 208. Third step 208 is now more particularly described with regard to FIGS. 5 and 6.

Figure 5:
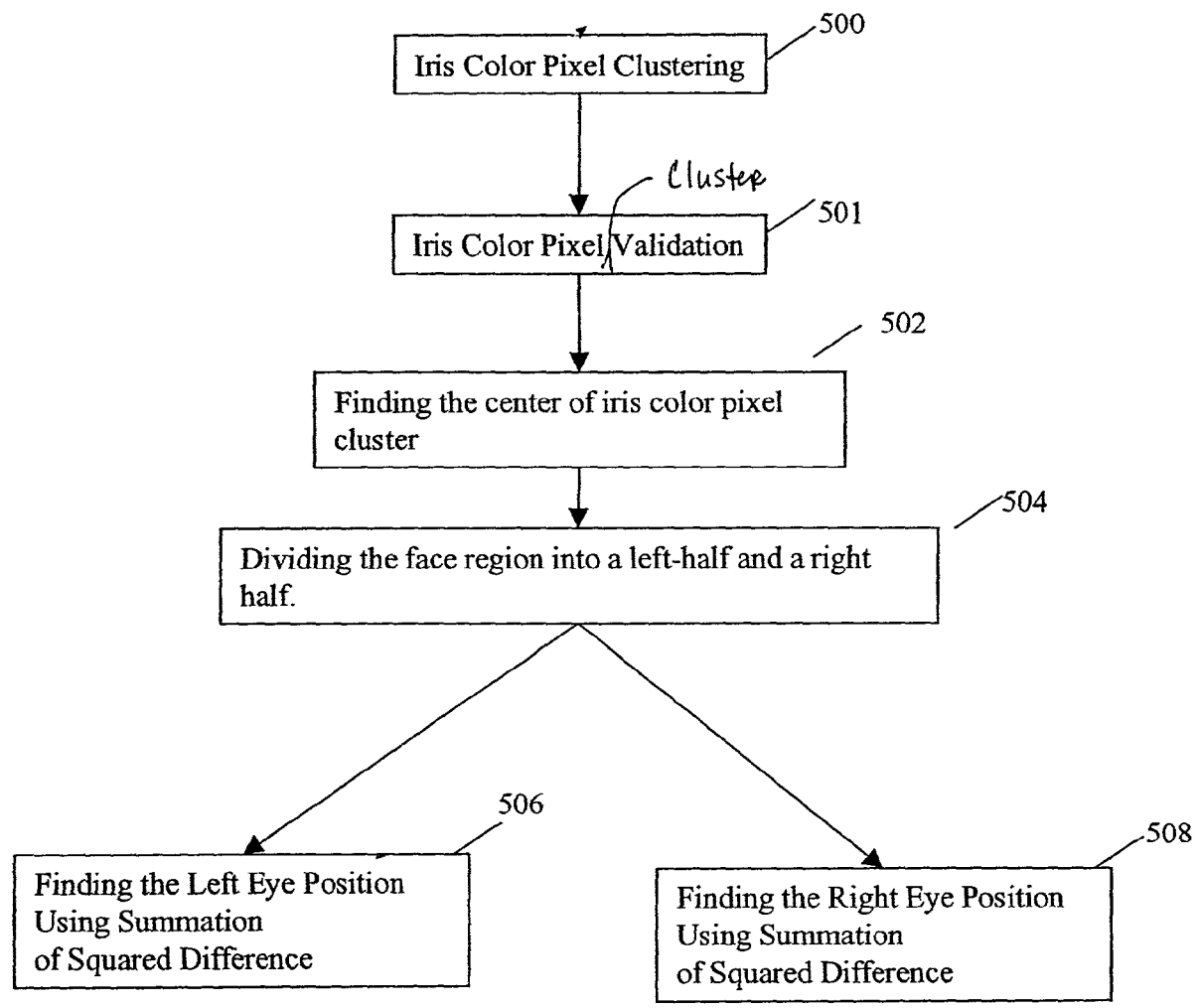
FIG. 5 shows a flow diagram showing eye position estimation steps.

FIG. 5 shows a flow diagram illustrating third step 208, the process of eye position detection using the iris color pixels. As is shown in FIG. 5, the eye position detection process starts with an iris color pixel clustering step 500. If iris color pixels are detected, then the iris pixels are assigned to a cluster. A cluster is a non-empty set of iris color pixels with the property that any pixel within the cluster is also within a predefined distance to another pixel in the cluster. One example of a predefined distance is one thirtieth of the digital image height. Iris color pixel clustering step 500 of FIG. 5 groups iris color pixels into clusters based upon this definition of a cluster. However, it will be understood that pixels may be clustered on the basis of other criteria.

Under certain circumstances, a cluster of pixels may not be valid. Accordingly, an optional step of validating the clusters is shown in FIG. 5 as iris color pixel cluster validation step 501. A cluster may be invalid, for example, if it contains too many iris color pixels or because the geometric relationship of the pixels in the cluster suggests that the cluster is not indicative of an iris. For example, if the ratio is greater than a pre-determined value, for example two, then the cluster is invalid. That is, the height to width ratio of each iris pixel cluster is determined, and the iris pixel cluster is invalid if the height to width ratio is greater than the predetermined value. A size measure might also be considered. That is, a size of each iris pixel cluster can be determined by counting the number of iris colored pixels within each iris pixel cluster; and the iris pixel cluster is invalid if the size of the size of the iris pixel cluster is greater than a pre-determined value. Invalid iris color pixel clusters are removed from further consideration by the method of the present invention. Accordingly, for ease of discussion, in the portions of the description that follow, valid iris color pixel clusters will hereinafter be referred to as iris pixel clusters.

After iris color pixel clustering step 500, a center for each of the clusters is calculated in cluster centering step 502. The center of a cluster is determined as the center of mass of the cluster. The center position of the clusters is calculated with respect to the origin of the image coordinate system. The origin of the image coordinate system for a digital image is typically defined at the upper left corner of the image boundary.

Figure 6:
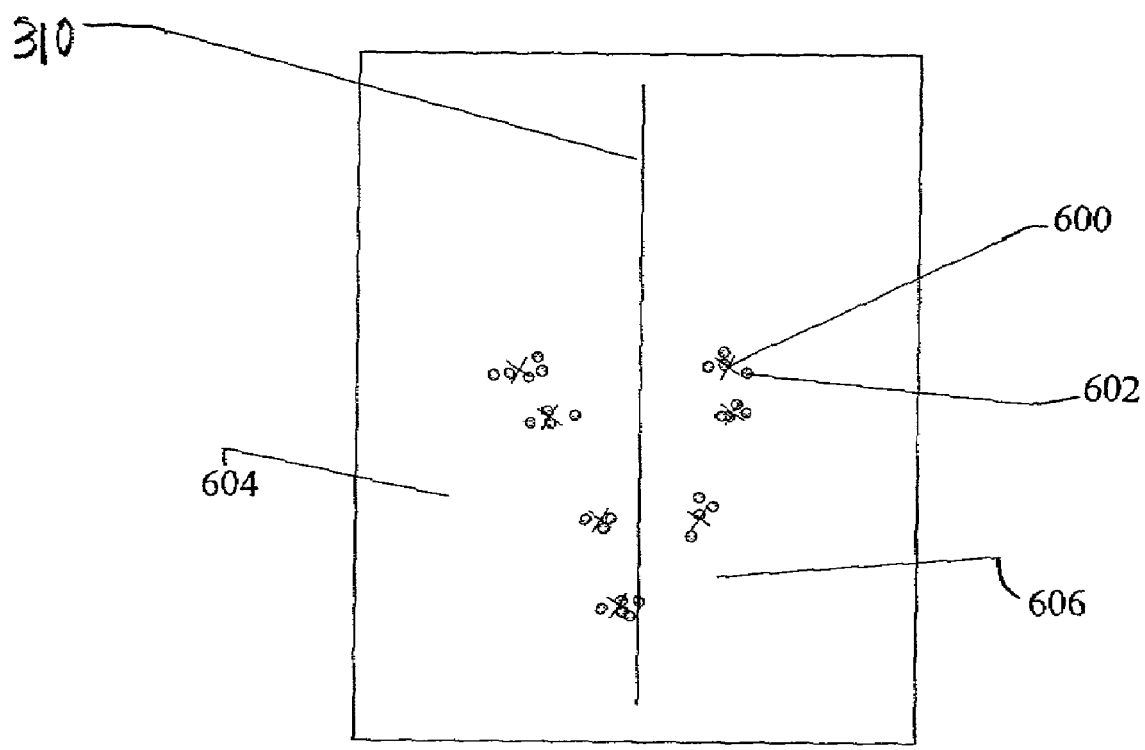
FIG. 6 is an illustration showing iris color pixel clusters.

A face division step 504 employs Face_center_column 310 to separate the skin color region into a left-half region and a right-half region. As is shown in FIG. 6, iris color pixel cluster 602 and cluster center 600 of the iris pixel clusters are positioned in either a left-half region 604 or a right-half region 606 separated by Face_center_column 310.

Referring again to FIG. 5, to locate eyes in the image using the iris pixel clusters, a left-eye position search step 506 is conducted in left-half region 604, preferably using a method known as the Summation of the Squared Difference. A right-eye position search step 508 is conducted in right-half region 606, preferably based on the same Summation of the Squared Difference method.

Left and right eye position search steps 506 and 508 and the summation of the squared difference method are now more particularly described with reference to FIGS. 7 and 8.

In general, the summation of the squared difference method involves calculating the summation of the squared difference of the intensity values of the corresponding pixels in an eye template and a patch of the image that has the same size as the template. In this method, each pixel in the patch of pixels has a corresponding pixel in the template. The difference between the intensity level of each of the corresponding pixels is calculated. Each difference is then squared. The sum of each of the squared differences for each of the pixels in the set is then calculated. This summation of the squared differences provides a relative measure of the degree of correspondence between each of the pixel sets measured and the template. The eye template itself is generated by averaging a large number of sample eye images.

Figure 8:
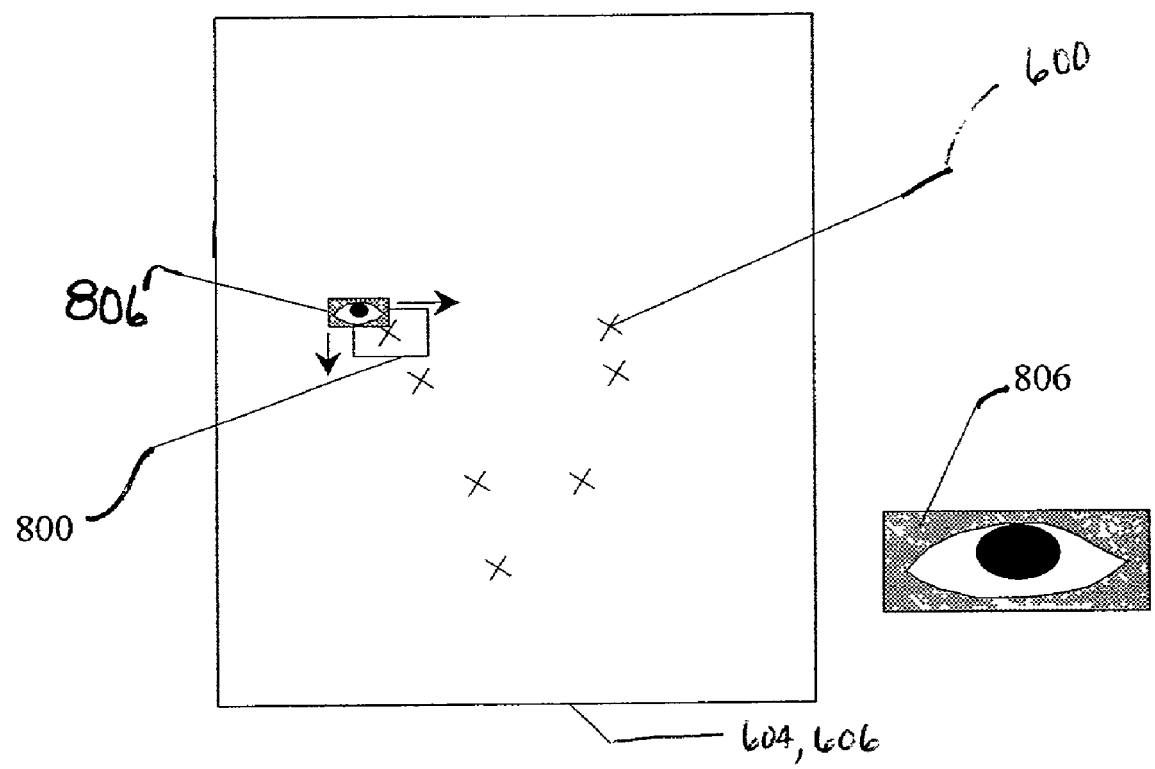
FIG. 8 is a view of an eye template in searching eye patches in an image.

For example, as shown in FIG. 8, a window 800 is centered at each cluster center 600 in a respective half-region of the image (604, 606). Window 800 has a size which covers substantially the entire cluster about which it centers. An eye template 806 is a template of an average eye, and moves within window 800.

As applied in the present invention, summation of the squared difference values are calculated for each pixel in each window in each half region. These values are compared and the pixel having the lowest relative summation of the squared difference value is identified as an eye location for the half-region. This process is performed separately on the clusters of the left and the right-half regions of the image in the manner described below.

It will be noted that while the present invention has been described as using the summation of the squared difference method to identify the best relative match between the average eye template and each of the pixels, other methods to determine the degree of relative correspondence can be used. In particular, the mean-squared error method can be used in place of the summation of the squared difference method.

Figure 7:
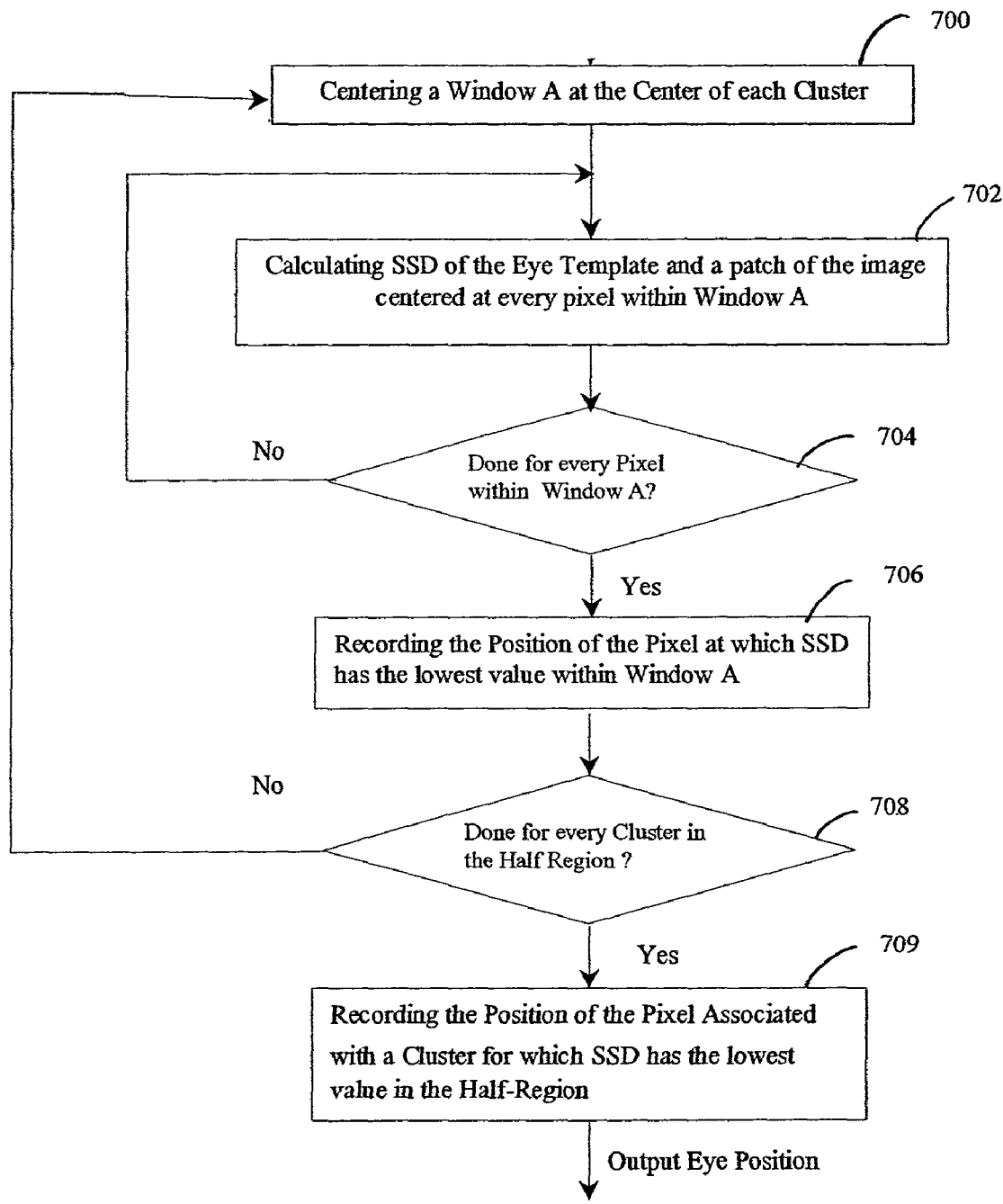
FIG. 7 shows a flow diagram illustrating the summation of squared difference used in eye template matching.

Referring now to FIGS. 7 and 8, left and right eye position search steps 506 and 508 are started with centering window 800 at each cluster center 810 in a respective half region (step 700). The operation of calculating the summation of the squared differences (step 702) is then performed, separately, using a patch of pixels centered on each of the pixels in each window 800 (step 704). The position of the pixel having the lowest summation of squared difference value in each window 800 is recorded (step 706). When this process has been completed for every cluster in a half region (step 708), the position of the pixel having the lowest summation of squared difference value for the half region is recorded (step 709). This position is the eye position for the half-region.

That is, the digital face image is separated into right half region 606 and left half region 604, and each iris pixel cluster is associated with either the right half region or the left half region. Eye template 806 is defined, and window 800 is centered at the center of each iris pixel cluster. An image patch is defined as having a size substantially (preferably, exactly) equal to the size of the eye template. Then, to locate the right eye position in the right half region, the pixel intensity level difference is determined between the eye template and the image patch, with the image patch being centered at each pixel in each window, and the window being centered at each cluster in the right half region. Similarly, to locate the left eye position in the left half region, the pixel intensity level difference is determined between the eye template and the image patch, with the image patch being centered at each pixel in each window, and the window being centered at each cluster in the left half region.

It will be appreciated that the summation of the squared difference method of steps 506 and 508 of FIG. 5, can also be performed without the use of face region extraction. In such an embodiment, the skin colored region can be divided into a left-half region and a right-half region. Iris color pixel clusters can then be divided into left-half region and right-half region clusters. The summation of the squared difference method can then be applied.

Fourth step 212 and fifth step 214 are used in finding a mouth position, and are more particularly described in FIGS. 9(a)–9(f). The input image to the step of extracting salient pixels and forming a signature curve (fourth step 212) is the original color face image.

Referring to FIG. 9(a), a morphological opening operation (step 901) is first applied to the image to eliminate bright spots such as reflection of eye glasses or spectacles. The opening operation preserves dark facial features such as eyes, nose and mouth. To extract salient pixels, the input image is then processed in step 902 with a high boost filter that is a type of high pass filter. The high boost filtering process is accomplished by convoluting the image with a high boost filter kernel 950 as shown in FIG. 9(b). High boost filter kernel 950 comprises a parameter H to be selected by the user. The action of a high pass filter is to remove flat intensity regions and retain places with high activities (i.e., intensity contrasts, between a dark region and a bright region). Examples of high activity places are shown as salient pixels 954 in FIG. 9(c).

Figure 9:
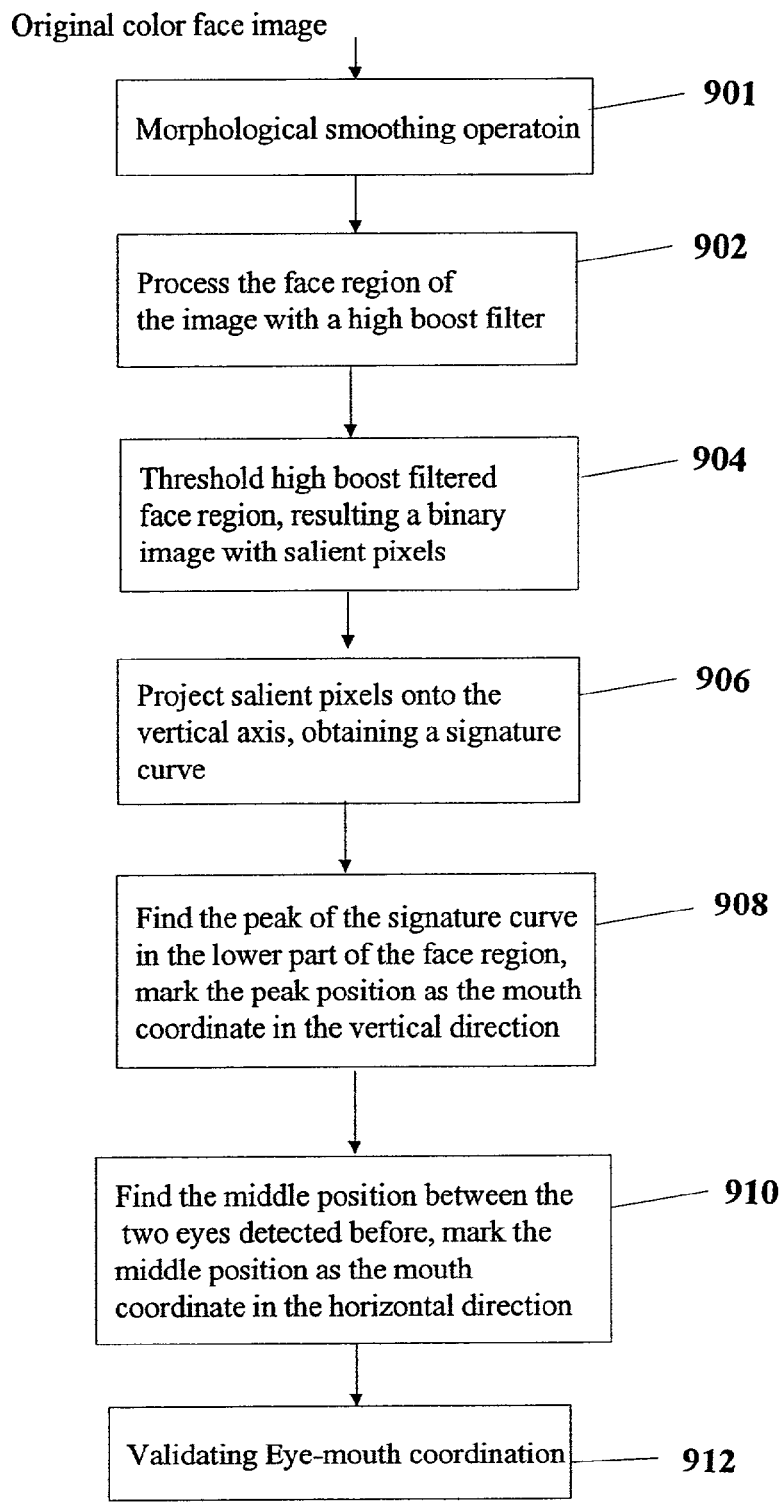
FIG. 9(a) shows a flow diagram for finding mouth position.
FIG. 9(b) shows a kernel.
FIG. 9(c) is a view of facial salient pixels and their projection onto the vertical axis.
FIG. 9(d) is an illustration of a lower half and upper half of a face region.
FIG. 9(e) shows a plot representative of a signature curve and peak points.
FIG. 9(f) shows an illustration of parameters M, E, and D.
Figure 9B:
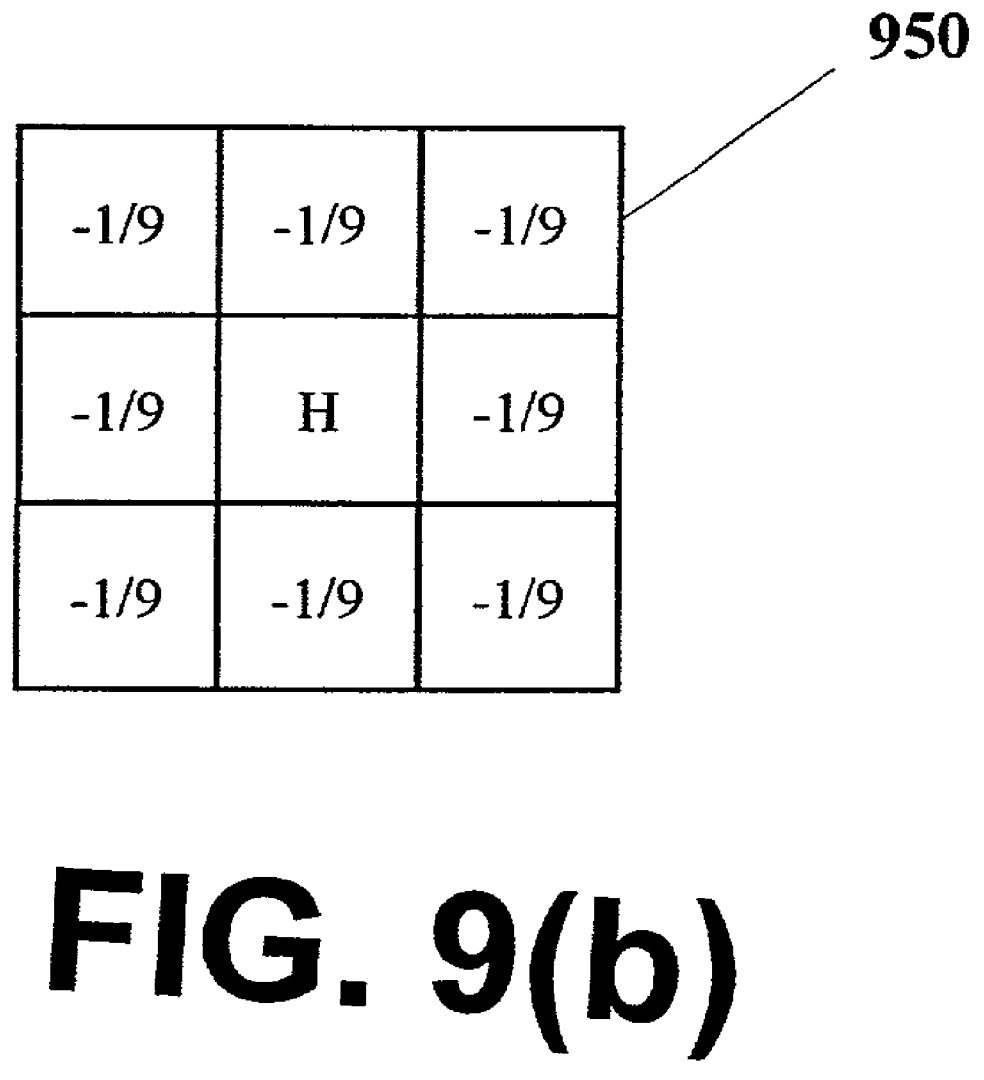
Figure 9C:
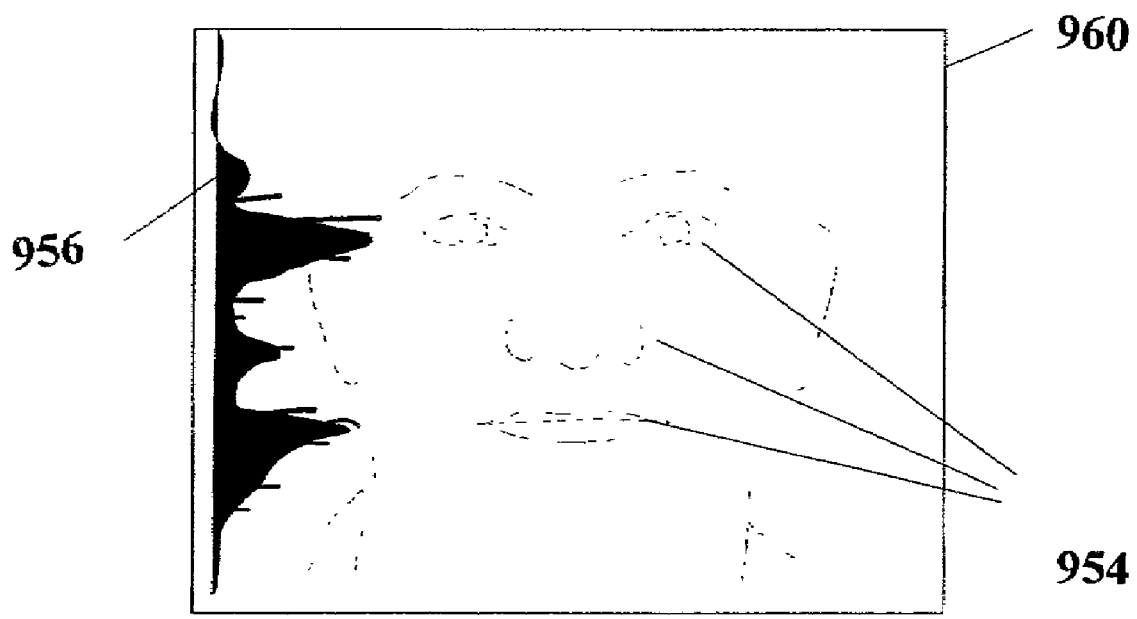
Figure 9D:
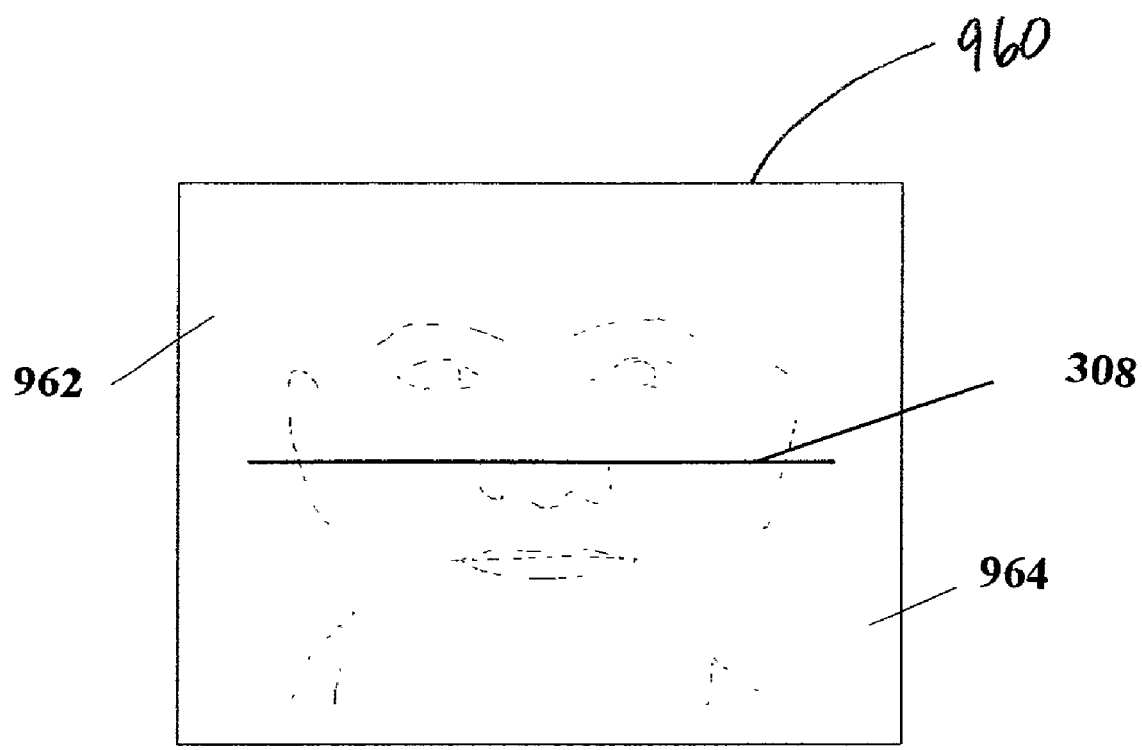
Figure 9E:
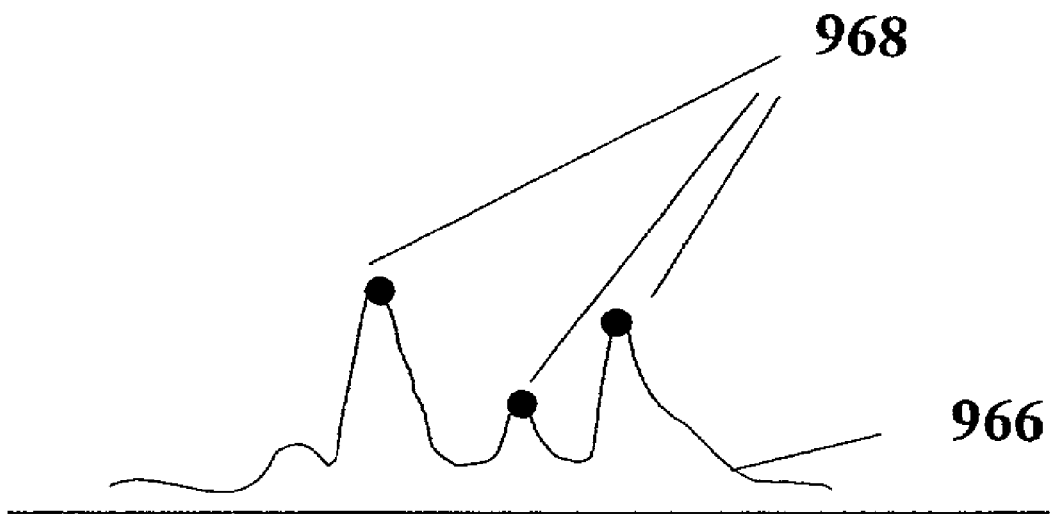
Figure 9F:
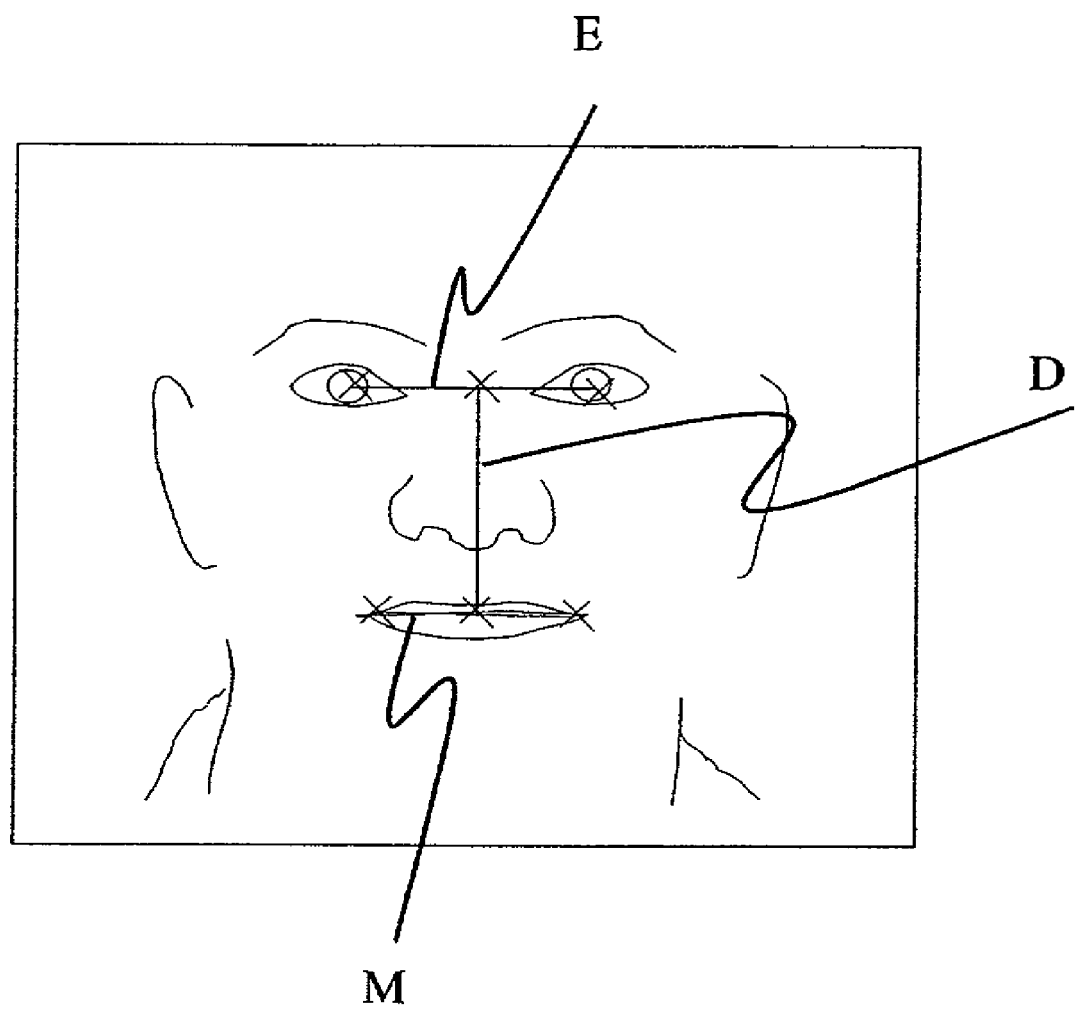

Salient pixels 954 are the result of thresholding the high boosted image into a binary image. Accordingly, step 904 comprises thresholding the high boosted image into a binary image to generate a binary image with salient pixels. An example of a binary image obtained after thresholding the high boost filtered original image is shown in FIG. 9 (*c*) as 960. Non-salient pixels are set to zeros. The example value of the parameter, H, of high boost filter kernel 950 is chosen as 9.

Following step 904 is step 906 comprising projecting salient pixels 954 onto a vertical axis to obtain a signature curve 956, as illustrated in FIG. 9(*c*). The projection is accomplished by counting the number of salient pixels 954 in the horizontal direction and then assigning the number to corresponding position on the vertical axis. It is evidently that there are more salient pixels in the eye and mouth regions than in any other regions. Therefore, the result of projecting salient pixels 954 is signature curve 956 with peaks signifying the places of mouth and eye regions.

Thus, the search of mouth position in the vertical direction becomes a search of a peak position on signature curve 956. This search is performed in step 908. However, before the search of step 908 is conducted, binary image 960 is divided into an upper half region 962 and a lower half region 964 as shown in FIG. 9(*d*). The divider is Face_center_row 308 obtained in face region extraction step 203. The search of step 908 is then performed in lower half region 964 of binary image 960 where the mouth resides.

The section of signature curve 956 in lower half region 964 may need to be smoothed a few times to remove spurs before the search takes place. FIG. 9(*e*) shows a smoothed signature curve 966 with a plurality of peak points 968.

The smoothing operation of signature curve 956 to generate smoothed signature curve 966 can be performed, for example, using a moving average filter or a median filter. A peak being at position i is true if the following is satisfied:

$$S(i-1)<S(i)<S(i+1)$$

where S(x) is the value of smoothed signature curve 966 at a position x. Typically there is more than one peak positions found in lower half region 964 of binary image 960. The position of the highest peak value is recorded. The reason for recording the highest peak value is because the mouth region most likely has more salient pixels 954 than other facial features such as a nose. The recorded peak position is subsequently used as the mouth position in the vertical direction.

Referring again to FIG. 9(*a*), the position of the mouth in the horizontal direction is determined at step 910 wherein the middle position is found between the two eyes detected in third step 208. This position is also used in step 912 wherein the eye-mouth coordination is validated. In step 912, the identified horizontal and vertical positions of the mouth are used as a starting point to group salient pixels 954 in the neighborhood of the identified mouth position into a mouth salient pixel cluster. That is, the salient pixels generally surrounding the identified mouth position are grouped into a mouth salient pixel cluster. Referring to FIG. 9(*f*), a distance M between a left and right boundary of the mouth salient pixel cluster is determined. A distance E between the two eyes positions identified in third step 208 is determined. Further, a distance D from an eye level (i.e., an imaginary line drawn between the two eye positions) to a mouth level (i.e., an imaginary line drawn between the left and right boundary of the mouth salient pixel cluster) is also determined.

A level of confidence of the detected eye-mouth coordination can be estimated, for example, using a ratio of M to E or E to D. That is, determining whether the ratio of M to E or E to D is within a predetermined range. For example, a high confidence level is estimated if the ratio of M to E is in a range of 0.89 to 0.99, or alternatively, if the ratio of E to D is in a range of 0.9 to 1.1. These ranges are derived from the statistics found in "Arthropometry of the Head and Face" by Leslie G. Farkas, incorporated herein by reference.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

In this manner, the present invention provides an efficient method for detecting normally appearing human eyes and mouth in a digital image.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

| PARTS LIST |
| --- |
| 50 image processing system |
| 100 digital image source |
| 102 image processor |
| 104 image display |
| 106 interface device; data and command entry device; keyboard |
| 107 computer readable storage medium |
| 108 data and command control device; mouse |
| 109 output device |
| 200 first step; skin color regions detection step |
| 201 color histogram equalization step |
| 202 skin color detection step |
| 203 face region extraction step |
| 206 second step; iris color pixel detection step |
| 208 third step; eye position detection step |
| 212 fourth step; salient pixel extraction and signature curve formation step |
| 214 fifth step; mouth location step |
| 216 modeling step; iris color Bayes model training step |
| 300 Face_top |
| 302 Face_bottom |
| 304 Face_left |
| 306 Face_right |
| 308 Face_center_row |
| 310 Face_center_column |
| 402 computing step |
| 404 computing step |
| 406 computing step |
| 408 computing step |
| 410 computing step |
| 412 iris intensity distribution function |
| 414 noniris intensity distribution function |
| 500 iris color pixel clustering step |
| 501 iris color pixel cluster validation step |
| 502 cluster centering step |
| 504 face division step |
| 506 left eye position search step |
| 508 right eye position search step |
| 600 cluster center |
| 602 iris color pixel cluster |
| 604 left-half region |
| 606 right-half region |
| 700 window centering step |

-continued

PARTS LIST

| | |
|---|---|
| 702 | summation of squared difference step |
| 704 | checking step |
| 706 | position recording step |
| 708 | checking step |
| 709 | position recording step |
| 800 | window |
| 806 | eye template |
| 901 | morphological opening operation step |
| 902 | high boost filter processing step |
| 904 | thresholding step |
| 906 | projecting step |
| 908 | searching step |
| 910 | mouth in horizontal direction step |
| 912 | eye-mouth coordination validation step |
| 950 | high boost filter kernel |
| 954 | salient pixels |
| 956 | signature curve |
| 960 | binary image |
| 962 | upper half region |
| 964 | lower half region |
| 966 | smoothed signature curve |
| 968 | peak points of smoothed signature curve |

What is claimed is:

1. A digital image processing method for locating eyes and mouth in a digital face image, comprising the steps of:
    a) detecting a plurality of iris colored pixels in the digital face image;
    b) grouping the plurality of iris colored pixels into iris color pixel clusters;
    c) determining a size of each iris color pixel cluster by counting the number of iris colored pixels within each iris color pixel cluster;
    d) detecting eye positions using the iris color pixel clusters;
    e) validating the iris pixel clusters, wherein the step of validating the iris color pixel clusters comprises the steps of:
        (i) determining the height to width ratio of each iris pixel cluster; and
        (ii) invalidating the iris pixel cluster if the height to width ratio is greater than a pre-determined value;
        (iii) invalidating the iris color pixel cluster if the size of the size of the iris color pixel cluster is greater than a pre-determined value;
    f) identifying salient pixels relating to a facial feature in the digital face image;
    g) generating a signature curve using the salient pixels; and
    h) using the signature curve and the eye positions to locate a mouth position.

2. A digital image processing method for locating eyes and mouth in a digital face image, comprising the steps of:
    detecting a plurality of iris colored pixels in the digital face image;
    grouping the plurality of iris colored pixels into iris pixel clusters;
    detecting eye positions using the iris pixel clusters;
    identifying salient pixels relating to a facial feature in the digital face image;
    generating a signature curve using the salient pixels; and
    using the signature curve and the eye positions to locate a mouth position;
    wherein the step of detecting eye positions comprises the steps of:
        a) defining an eye template having a size;
        b) defining an image patch having a size substantially equal to the size of the eye template;
        c) determining a center of each iris pixel cluster;
        d) defining a window for each iris pixel cluster, the window being centered at the center of each iris pixel cluster;
        e) separating the digital face image into a right half region and a left half region;
        f) associating each iris pixel cluster with either the right half region or the left half region;
        g) locating a right eye position in the right half region by, for each iris pixel cluster disposed in the right half region, centering the image patch on each pixel in the window and determining a pixel intensity level difference between the eye template and the image patch; and
        h) locating a left eye position in the left half region by, for each iris pixel cluster disposed in the left half region, centering the image patch on each pixel in the window and determining a pixel intensity level difference between the eye template and the image patch.

3. The method of claim 2, wherein locating the right eye position in the right half is accomplished using a summation of squared difference method; and locating the left eye position in the left half is accomplished using the summation of squared difference method.

4. The method of claim 2, wherein locating the right eye position in the right half is accomplished using a mean-squared error method; and locating the left eye position in the left half is accomplished using the mean-squared error method.

5. The method of claim 2, wherein the step of detecting eye positions comprises the step of applying a summation of squared difference method to the image patches associated with the iris pixel clusters.

6. The method of claim 2, wherein the step of detecting eye positions comprises the step of applying a mean-squared error method to the image patches associated with the iris pixel clusters.

7. The method of claim 2, wherein the step of separating the digital face image into the right half and the left half comprises the steps of:
    a) determining a left boundary of the digital face image;
    b) determining a right boundary of the digital face image; and
    c) determining a mid-point between the left boundary and the right boundary.

8. A digital image processing method for locating eyes and mouth in a digital face image, comprising the steps of:
    a) detecting a plurality of iris colored pixels in the digital face image;
    b) grouping the plurality of iris colored pixels into iris color pixel clusters, each iris color pixel cluster being representative of a candidate eye position;
    c) selecting a pair of candidate eye positions;
    d) identifying salient pixels relating to a facial feature in the digital face image;
    e) generating a signature curve using the salient pixels; and
    f) using the signature curve and the eye positions to locate a mouth position; and
    validating the eyes and mouth position, wherein the step of validating the eyes and mouth position comprises the steps of:
        a) grouping the salient pixels surrounding the mouth position to define a mouth salient pixel cluster;

b) calculating a distance M between a left boundary and a right boundary of the mouth salient pixel cluster;
c) calculating a distance E between the eyes positions;
d) determining a first ratio of M to E; and
e) determining whether the first ratio is within a predetermined first range.

9. The method of claim 8, further comprising the steps of:
a) calculating a distance D between an eye level position and a mouth level position;
b) determining a second ratio of E to D; and
c) determining whether the second ratio is within a predetermined second range.

10. A digital image processing method for locating eyes and mouth in a digital face image, comprising the steps of:
detecting a plurality of iris colored pixels in the digital face image;
grouping the plurality of iris colored pixels into iris pixel clusters;
detecting eye positions using the iris pixel clusters;
identifying salient pixels relating to a facial feature in the digital face image;
generating a signature curve using the salient pixels;
finding peaks of the signature curve;
using the signature curve and the eye positions to locate a mouth position; and
validating the eyes and mouth position;
wherein the step of detecting eye positions comprises the steps of:
a) determining a center of each iris pixel cluster;
b) defining a window for each iris pixel cluster, the window being centered at the center of each iris pixel cluster, the window having a size sufficient to cover the iris pixel cluster;
c) separating the digital face image into a right half region and a left half region;
d) associating each iris pixel cluster with either the right half region or the left half region;
e) locating a right eye position in the right half region by determining a pixel intensity level difference between an average eye and an image patch, the image patch having a size substantially equal to a size of the average eye, the image patch being centered at each pixel in the window, the window being centered at each iris pixel cluster in the right half region; and
f) locating a left eye position in the left half region by determining a pixel intensity level difference between the average eye and the image patch, the image patch being centered at each pixel in the window, the window being centered at each iris pixel cluster in the left half region.

11. The method of claim 10, wherein the step of detecting eye positions comprises the step of applying a summation of squared difference method to the image patches associated with the iris pixel clusters.

12. The method of claim 11, wherein the average eye is generated by averaging a large number of sample eye images.

13. A digital image processing method for locating eyes and mouth in a digital face image, comprising the steps of:
a) detecting a plurality of iris colored pixels in the digital face image;
b) grouping the plurality of iris colored pixels into iris pixel clusters;
c) detecting eye positions using the iris pixel clusters;
d) identifying salient pixels relating to a facial feature in the digital face image;
e) generating a signature curve using the salient pixels;
f) finding peaks of the signature curve;
g) using the signature curve and the eye positions to locate a mouth position; and
h) validating the eyes and mouth position, wherein the step of validating the eyes and mouth position comprises the steps of:
a) grouping the salient pixels surrounding the mouth position to define a mouth salient pixel cluster;
b) calculating a distance M between a left boundary and a right boundary of the mouth salient pixel cluster;
c) calculating a distance B between the eyes positions;
d) determining a first ratio of M to E;
e) determining whether the first ratio is within a predetermined first range;
f) calculating a distance D between an eye level position and a mouth level position;
g) determining a second ratio of E to D; and
h) determining whether the second ratio is within a predetermined second range.

* * * * *